United States Patent
Brassard

(10) Patent No.: US 12,351,207 B2
(45) Date of Patent: Jul. 8, 2025

(54) INERTIAL MEASUREMENT UNIT (IMU) SENSOR DATA OUTPUT AGGREGATION

(71) Applicant: GM Cruise Holdings LLC, San Francisco, CA (US)

(72) Inventor: Joseph Brassard, Somerville, MA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 224 days.

(21) Appl. No.: 18/156,346

(22) Filed: Jan. 18, 2023

(65) Prior Publication Data
US 2024/0239369 A1    Jul. 18, 2024

(51) Int. Cl.
*B60W 60/00*    (2020.01)

(52) U.S. Cl.
CPC ..... *B60W 60/001* (2020.02); *B60W 2420/408* (2024.01)

(58) Field of Classification Search
CPC ......... B60W 60/001; B60W 2420/408; B60W 2420/403; B60W 40/10
See application file for complete search history.

(56) References Cited

U.S. PATENT DOCUMENTS

| | | | | |
|---|---|---|---|---|
| 11,897,486 | B1* | 2/2024 | Adams | G01C 25/005 |
| 12,165,446 | B1* | 12/2024 | Adams | G07C 5/006 |
| 2019/0186920 | A1* | 6/2019 | Leach | G05D 1/027 |
| 2021/0024081 | A1* | 1/2021 | Johnson-Roberson | G05D 1/0246 |

* cited by examiner

*Primary Examiner* — Michael J Zanelli
(74) *Attorney, Agent, or Firm* — CANTOR COLBURN LLP

(57) ABSTRACT

Systems and techniques are provided for aggregating data output from multiple Inertial Measurement Units (IMUs) for a localization of an autonomous vehicle (AV). An example method includes receiving a first measurement output from a first IMU associated with a first sensor of an AV and a second measurement output from a second IMU associated with a second sensor of the AV; adjusting the first measurement output based on a first offset vector corresponding to the first IMU to obtain a first adjusted measurement output; adjusting the second measurement output based on a second offset vector corresponding to the second IMU to obtain a second adjusted measurement output; and determining a pose of the AV based on the first adjusted measurement output and the second adjusted measurement output.

17 Claims, 5 Drawing Sheets

INERTIAL MEASUREMENT UNIT (IMU) SENSOR DATA OUTPUT AGGREGATION

TECHNICAL FIELD

The present disclosure generally relates to a sensor system of an autonomous vehicle and, more specifically, to systems and techniques for aggregating data output from multiple Inertial Measurement Units (IMUs) of an autonomous vehicle.

BACKGROUND

An autonomous vehicle is a motorized vehicle that can navigate without a human driver. An exemplary autonomous vehicle can include various sensors, such as a camera sensor, an Inertial Measurement Unit (IMU), a light detection and ranging (LiDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

Illustrative examples and aspects of the present application are described in detail below with reference to the following figures.

DETAILED DESCRIPTION

Figure 1:
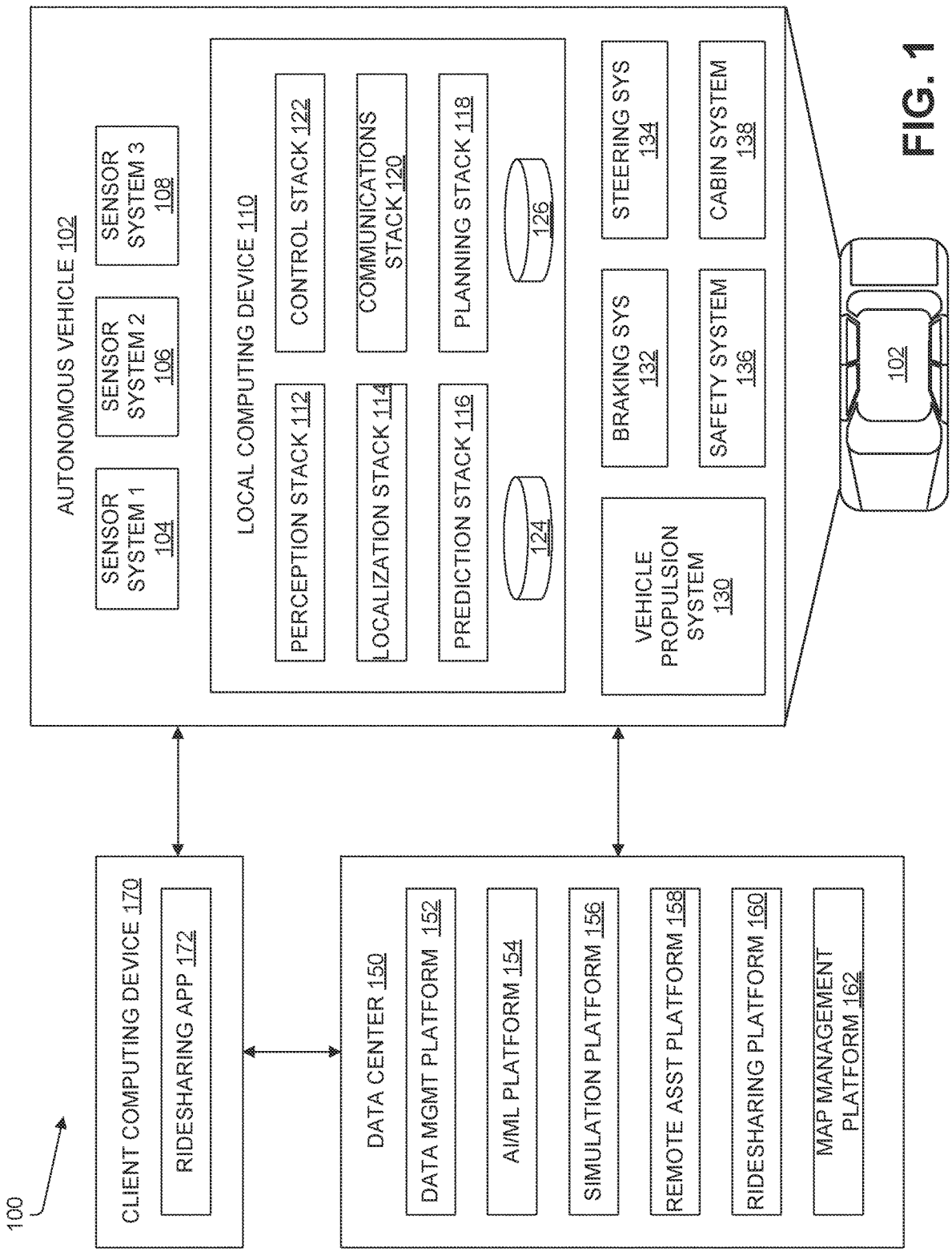
FIG. 1 is a diagram illustrating an example system environment that can be used to facilitate autonomous vehicle (AV) navigation and routing operations, in accordance with some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of the subject matter of the application. However, it will be apparent that various aspects and examples of the disclosure may be practiced without these specific details. The figures and description are not intended to be restrictive.

The ensuing description provides examples and aspects of the disclosure, and is not intended to limit the scope, applicability, or configuration of the disclosure. Rather, the ensuing description of the examples and aspects of the disclosure will provide those skilled in the art with an enabling description for implementing an example implementation of the disclosure. It should be understood that various changes may be made in the function and arrangement of elements without departing from the scope of the application as set forth in the appended claims.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, an Inertial Measurement Unit (IMU), a light detection and ranging (LIDAR) sensor, a radio detection and ranging (RADAR) sensor, an audio sensor, amongst others, which the AVs can use to collect data and measurements that the AVs can use for operations such as navigation. The sensors can provide the data and measurements to an internal computing system of the AV, which can use the data and measurements to control a mechanical system of the AV, such as a vehicle propulsion system, a braking system, or a steering system.

IMUs are commonly used for the localization and/or positioning of an AV. More specifically, IMUs measure linear acceleration and rotational acceleration that can provide information on current AV location and orientation. Some AVs can have one or more dedicated or stand-alone IMUs that may work independently. For example, an IMU may be connected to a vehicle chassis and communicate with an AV computing system that controls a localization system and/or steering system. Such stand-alone IMU requires a high sampling rate (also referred to as sample rate or output data rate) to maximize sampling resolution and ensure functional accuracy and safety in determining the location and/or pose of an AV. However, an IMU that has a high sampling rate can be costly. Alternatively, low-cost bus protocols can be designed to support the specific IMU. However, this requires high throughout vehicle connectivity to support the extra messages and content, which would raise the cost and add system complexity. Therefore, there exists a need for systems and techniques that can utilize multiple IMUs that are part of other sensors of an AV in order to achieve a sampling rate that is sufficient for localization of an AV.

Described herein are systems, apparatuses, processes (also referred to as methods), and computer-readable media (collectively referred to as "systems and techniques") for aggregating data output from multiple IMUs for localization of an AV. More specifically, the systems and techniques provided herein can utilize multiple IMUs that can be placed at various locations of an AV. In some aspects, the data output from the IMUs can be offset by a respective vector such that the data output corresponds to a common location of the AV. In some examples, the data output from the IMUs can be aggregated (e.g., combined) to obtain an aggregate of data outputs (e.g., IMU measurement outputs) having a higher sampling rate than each individual IMU.

To illustrate, various sensors on an AV have built-in IMUs where an IMU is integrated into a sensor system (e.g., on a circuit board of the particular sensor). For example, integrating an IMU with a camera can provide image stabilization by tracking the localizations of a camera. In another example, a Global Positioning System (GPS) with a built-in IMU can synchronize the IMU data and the GPS position information to provide reliable and accurate global positioning and orientation. In some cases, a low-cost IMU that has a relatively lower sampling rate can be used in conjunction with such sensors because the primary purpose of having an integrated IMU is to detect how the sensors are oriented, which does not require a high resolution of measurements/samples. In some examples, the systems and techniques of the present disclosure can pre-compensate each IMU that is integrated into another sensor of an AV with a vector to offset the data outputs onto that of the origin of an AV (e.g., a center of rotation of the AV). As follows, each IMU can output samples (e.g., measurements) that are offset in phase based on the pre-compensated vector. Instead of installing a stand-alone IMU with a high sampling rate, the systems and techniques can reduce the cost, effort, time, and computation resources by utilizing the low-cost (and already existing) multiple IMUs that have a low sampling rate to achieve a high sampling rate for a localization of an AV.

Various examples of the systems and techniques described herein for aggregating data output from multiple IMUs for a localization of an autonomous vehicle are illustrated in FIG. 1 through FIG. 5 and described below.

FIG. 1 is a diagram illustrating an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the ridesharing application 172 to enable passengers to view the AV 102 in transit en route to a pick-up or drop-off location, and so on.

While the AV 102, the local computing device 110, and the AV environment 100 are shown to include certain systems and components, one of ordinary skill will appreciate that the AV 102, the local computing device 110, and/or the AV environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 5.

Figure 2:
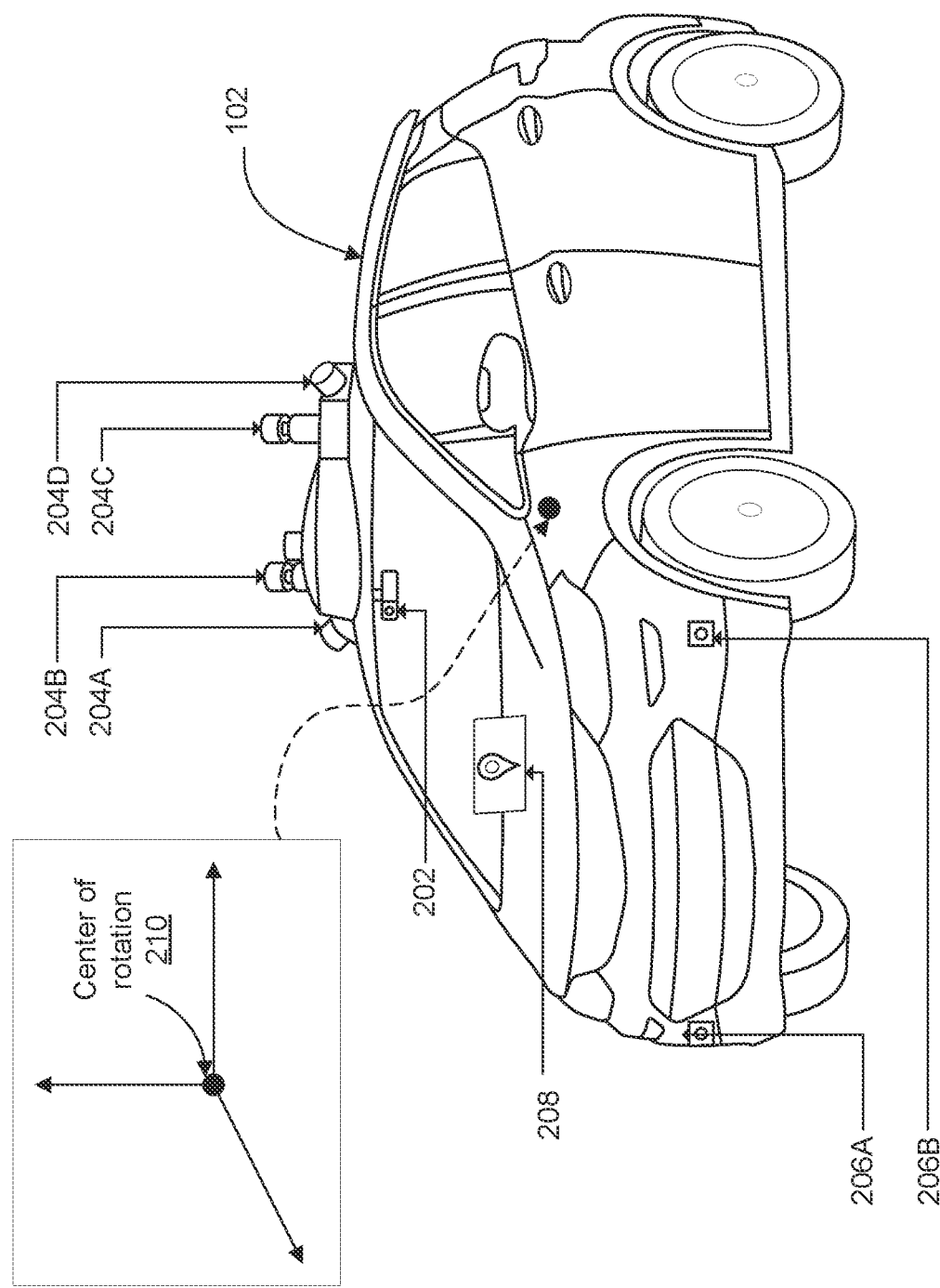
FIG. 2 illustrates an example diagram of an AV including various sensors, in accordance with some examples of the present disclosure.

FIG. 2 illustrates an example diagram of an AV 102 including various sensors (similar to sensor systems 104-108 as illustrated in FIG. 1). As shown, AV 102 has a plurality of sensors such as camera 202, LiDARs 204A, 204B, 204C, 204D (collectively, LiDAR 204), RADARs 206A, 206B (collectively, RADAR 206), GPS/Global Navigation Satellite System (GNSS) 208 that are mounted on various locations of AV 102. In some examples, such sensors can have a built-in IMU integrated into a circuit board of the sensors (e.g., in the form of a chip within the sensors) in order to detect how the sensors are oriented.

In some examples, a built-in IMU produces IMU data (e.g., measurement data) indicative of a dynamic motion of a sensor in which the IMU is integrated into. More specifically, IMU data can include measurements associated with linear acceleration and rotational acceleration of a sensor (e.g., camera 202, LiDAR 204, RADAR 206, GPS/GNSS 208). As follows, an integrated sensor system with a built-in IMU can use IMU data to compensate for any impact on the sensor placement (e.g., tilt, vibration, etc.). For example, camera 202 that captures a visual representation (e.g., image data) of the surroundings of AV 102 can have a built-in IMU for image stabilization. In some cases, a built-in IMU can provide camera localization information that can be used to align the image and/or video that is captured by camera 202 in case of any vibrations or misalignments of camera 202 (e.g., when AV 102 drives on a bumpy road).

In some aspects, a built-in IMU produces IMU data at a certain sampling rate, which refers to the number of samples output by an IMU over time. In other words, a sampling rate (also often referred to as data output rate or sample rate) indicates the number of measurements generated by an IMU per unit of time (e.g., per second). For example, if an IMU has a sampling rate of 50 Hz, the IMU generates 50 measurements/samples per second.

In some examples, IMUs at various locations can be pre-compensated with a vector (e.g., an offset vector). More specifically, each built-in IMU can be calibrated with a vector to offset the data output (e.g., measurements by an IMU) onto a particular location on an AV. In some examples, the vector can be used to offset the IMU data to a center of rotation 210 of AV 102 (e.g., a center of rear axle of AV 102). The systems and techniques described herein can translate vectors of the sensors (e.g., camera 202, LiDAR 204, RADAR 206, GPS/GNSS 208) based on center of rotation 210 at (0, 0, 0) and add a static offset to data outputs so that all built-in IMUs at various locations can have the same frame of reference. For example, a measurement output from an IMU integrated with LiDAR 204A can be adjusted based on an offset vector that associates LiDAR 204A (e.g., located at $(x_1, y_1, z_1)$) with center of rotation 210 at (0, 0, 0). In another example, a measurement output from an IMU integrated with LiDAR 204B can be adjusted based on an offset vector that associates LiDAR 204B (e.g., located at $(x_2, y_2, z_2)$) with center of rotation 210 at (0, 0, 0). As follows, both IMUs on LiDAR 204A and LiDAR 204B can have the same frame of reference (e.g., an absolute origin at (0, 0, 0)) based on the vector translation.

In some cases, an offset vector can be determined during the calibration of sensors. For instance, the systems and techniques of the present disclosure can determine an offset vector for an IMU when a sensor that incorporates the IMU is getting calibrated. As follows, an offset vector can be determined at the time of calibration based on the location of sensors on/within AV 102 (in three-dimensional coordinates) and center of rotation 210 of AV 102.

In some aspects, the systems and techniques described herein can determine an average of measurement outputs from a plurality of IMUs that have been adjusted based on respective offset vectors. For example, adjusted measurement outputs associated with IMUs on LiDAR 204A, 204B, 204C, 204D can be combined and divided by four to obtain an average of adjusted measurement outputs. The average of adjusted measurement outputs can be compared against each of the adjusted measurement outputs to determine any variance. In some examples, the comparison between each of the adjusted measurement outputs and the average of the adjusted measurement outputs can be based on a covariance matrix (e.g., by looking at the variance between outputs/measurements).

In some examples, if the difference between one of the adjusted measurement outputs and the average of adjusted measurement outputs exceeds an error threshold, the systems and techniques can eliminate the adjusted measurement output value in determining the average of adjusted measurement outputs.

Furthermore, if the difference between an adjusted measurement output from a particular IMU and an average of adjusted measurement outputs from a plurality of IMUs including the particular IMU exceeds an error threshold, the systems and techniques of the present disclosure can determine/examine whether the particular IMU or a sensor (in which the particular IMU is integrated) is experiencing a failure or having any issue. For example, if a sensor mounted on AV 102 gets knocked over or tilted, the measurement data output by an IMU on the affected sensor will likely diverge from an average of the measurement outputs.

Figure 3:
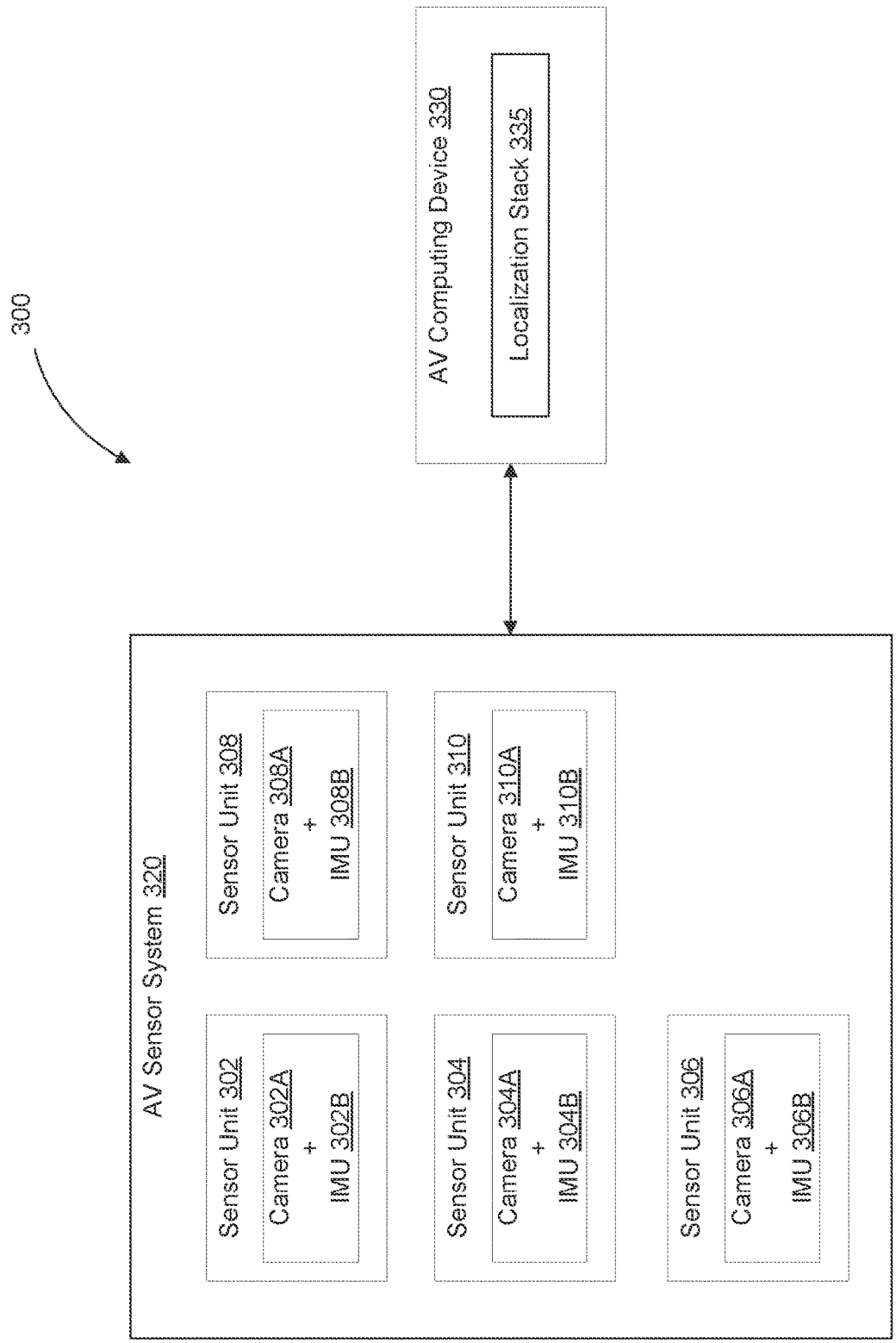
FIG. 3 illustrates an example system for aggregating data output from multiple IMUs for a localization of an AV, in accordance with some examples of the present disclosure.

FIG. 3 illustrates an example system 300 for aggregating data output from multiple IMUs for localization of an AV (e.g., AV 102 as illustrated in FIGS. 1 and 2). As shown, AV sensor system 320 of AV 102 comprises multiple sensor units 302, 304, 306, 308, and 310. Each sensor unit comprises an integrated set of a camera (e.g., camera 302A, 304A, 306A, 308A, 310A) and an IMU (302B, 304B, 306B, 308B, 310B). For example, sensor unit 302 includes camera 302A and IMU 302B, which can be integrated into camera 302A (e.g., mounted on a circuit board associated with camera 302A). While five sensor units comprising a set of a camera and an IMU are described with respect to FIG. 3, those skilled in the art will recognize that the systems and techniques described herein may be implemented using a different number of sensors/sensor units that are mounted on AV 102 as well as different types and/or different positions of sensors/sensor units that have a built-in IMU.

In some examples, the systems and techniques described herein can determine an offset vector based on a location/placement of each sensor unit (e.g., in three-dimensional coordinates) with respect to a point of reference within an AV. In some cases, the point of reference can correspond to a center of rotation such as center of rotation 210 of AV 102. In some aspects, the offset vectors can be used to change the frame of reference for the IMUs such that all IMUs (e.g., IMUs 302B, 304B, 306B, 308B, 310B) have the same frame of reference.

In some aspects, data outputs that are generated by IMUs can be adjusted based on the respective offset vector. For example, the data output of IMU 302B can be adjusted based on its offset vector, which can be determined based on the location of sensor unit 302 and the center of rotation of AV 102. The data output of IMU 304B can be adjusted based on its offset vector, which can be determined based on the location of sensor unit 304 and the center of rotation of AV 102. In further examples, the data outputs of IMU 306B, 308B, 310B can be adjusted in a similar manner.

In some examples, data outputs (e.g., measurement outputs) that are generated by IMUs can include timestamps indicative of when the measurement/sample is taken. The systems and techniques of the present disclosure can identify a timestamp for each measurement/sample of data outputs. In some examples, measurements that are taken at the same time or within a predetermined time window (e.g., within a threshold number of milliseconds) can be combined. For example, measurement outputs by IMU 302B, 304B, 306B, 308B, 310B that are taken at time/or time t+/−a predetermine time window (e.g., 10 milliseconds) can be aggregated together.

In some aspects, a sampling rate of multiple IMUs can be combined to result in an increased sampling rate. For example, if each of the IMUs (e.g., IMU 302B, IMU 304B, IMU 306B, IMU 308B, IMU 310B) has a sampling rate of 50 Hz, the aggregate sampling rate for the total measurement outputs becomes 250 Hz. As follows, the effective sampling rate for the adjusted measurement outputs from all five IMUs can be 250 Hz when each of the five IMUs has a sampling rate of 50 Hz. In other words, the aggregate measurement outputs can come through at an increased sampling rate, which is an aggregate of all sampling rates of the IMUs.

In some cases, a sensor unit (e.g., sensor units 302, 304, 306, 308, 310) can communicate with AV computing device 330 (similar to local computing device 110 as illustrated in FIG. 1). While a built-in IMU may not have the capability of directly communicating with AV computing device 330, sensor units 302, 304, 306, 308, 310 can provide sensor data including image data captured by cameras (e.g., camera 302A, 304A, 306A, 308A, 310A) and IMU measurement data captured by IMUs (e.g., IMUs 302B, 304B, 306B, 308B, 310B) to AV computing device 330. For example, the sensor units may communicate with AV computing device 330 using a protocol that is based on Ethernet or Gigabit Multimedia Serial Link (GMSL). In some examples, AV computing device 330 (e.g., localization stack 335, which is similar to localization stack 114 as illustrated in FIG. 1) can perform the vector translation, time synchronization of measurement outputs, and/or adjustment of measurement outputs based on the data received from AV sensor system 320. In some aspects, AV computing device 330 can determine a pose of AV 102 based on adjusted measurement outputs from multiple IMUs (e.g., IMUs 302B, 304B, 306B, 308B, 310B) for localization of AV 102. The effective sampling rate for the adjusted measurement outputs from multiple IMUs can be an aggregate of sampling rates of the multiple IMUs.

Figure 4:
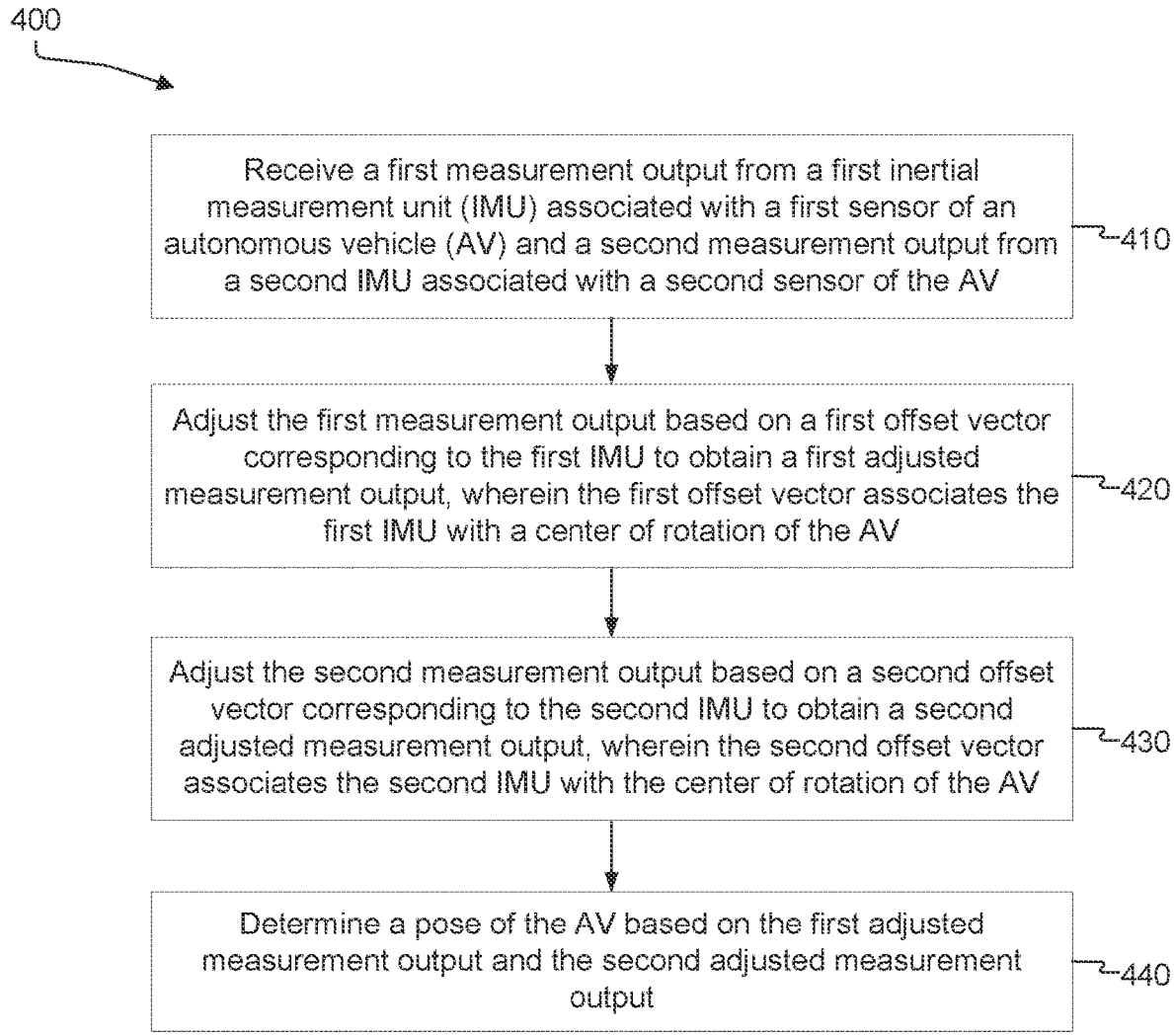
FIG. 4 is a flowchart illustrating an example process for determining a pose of an AV based on data output from multiple IMUs, in accordance with some examples of the present disclosure.

FIG. 4 is a flowchart illustrating an example process 400 for determining a pose of an AV based on sensor data output from multiple IMUs. Although the example process 400 depicts a particular sequence of operations, the sequence may be altered without departing from the scope of the present disclosure. For example, some of the operations depicted may be performed in parallel or in a different sequence that does not materially affect the function of process 400. In other examples, different components of an example device or system that implements process 400 may perform functions at substantially the same time or in a specific sequence.

At block 410, process 400 can include receiving a first measurement output from a first IMU associated with a first sensor of AV and a second measurement output from a second IMU associated with a second sensor of the AV. For example, AV computing device 330 (or local computing device 110) can receive a first measurement output from IMU 302B, which is associated with camera 302A of AV 102 and a second measurement output from IMU 304B, which is associated with camera 304A of AV 102. In some examples, an IMU (e.g., IMUs 302B, 304B, 306B, 308B, 310B) is a built-in sensor, which is integrated into a camera (e.g., a circuit board of cameras 302A, 304A, 306A, 308A, 310A, respectively) for stabilizing sensor data of the camera.

At block 420, process 400 can include adjusting the first measurement output based on a first offset vector corresponding to the first IMU to obtain a first adjusted measurement output, wherein the first offset vector associates the first IMU with a center of rotation of the AV. For example, if IMU 302B is located at $(x_1, y_1, z_1)$, AV computing device 330 (or local computing device 110) can determine an offset vector based on $(x_1, y_1, z_1)$ and a center of rotation of AV 102 (e.g., at (0, 0, 0)). Further, AV computing device 330 can adjust the first measurement output based on the offset vector corresponding to IMU 302B.

At block 430, process 400 can include adjusting the second measurement output based on a second offset vector corresponding to the second IMU to obtain a second adjusted measurement output, wherein the second offset vector associates the second IMU with the center of rotation of the AV. For example, if IMU 304B is located at $(x_2, y_2, z_2)$, AV computing device 330 (or local computing device 110) can determine an offset vector based on $(x_2, y_2, z_2)$ and a center of rotation of AV 102 (e.g., at (0, 0, 0)). Further, AV computing device 330 can adjust the second measurement output based on the offset vector corresponding to IMU 304B.

At block 440, process 400 can include determining a pose of the AV based on the first adjusted measurement output and the second adjusted measurement output. For example, AV computing device 330 (or local computing device 110) can determine a pose of AV 102 based on the first adjusted measurement output associated with IMU 302B and the second adjusted measurement output associated with IMU 304B.

In some examples, the first measurement output can include a first plurality of measurement outputs associated with a first sampling rate and the second measurement output can include a second plurality of measurement outputs associated with a second sampling rate. For example, if IMU 302A has a sampling rate of 50 Hz, IMU 302A can generate 50 samples/measurements per second. In another example, if IMU 304B has a sampling rate of 60 Hz, IMU 304B can generate 60 samples/measurements per second.

In some aspects, measurements that are output by multiple IMUs and adjusted by respective offset vectors can be combined together to obtain an average of adjusted measurement outputs. For example, AV computing device 330 (or local computing device 110) can determine an average of adjusted measurement output based on the first adjusted measurement output associated with IMU 302B and the second adjusted measurement output associated with IMU 304B. If IMU 302B has a sampling rate of 50 Hz and IMU 304B has a sampling rate of 60 Hz, AV computing device 330 can determine that the average of adjusted measurement outputs from IMU 302B and 304B is associated with an aggregate sampling rate, 110 Hz.

Figure 5:
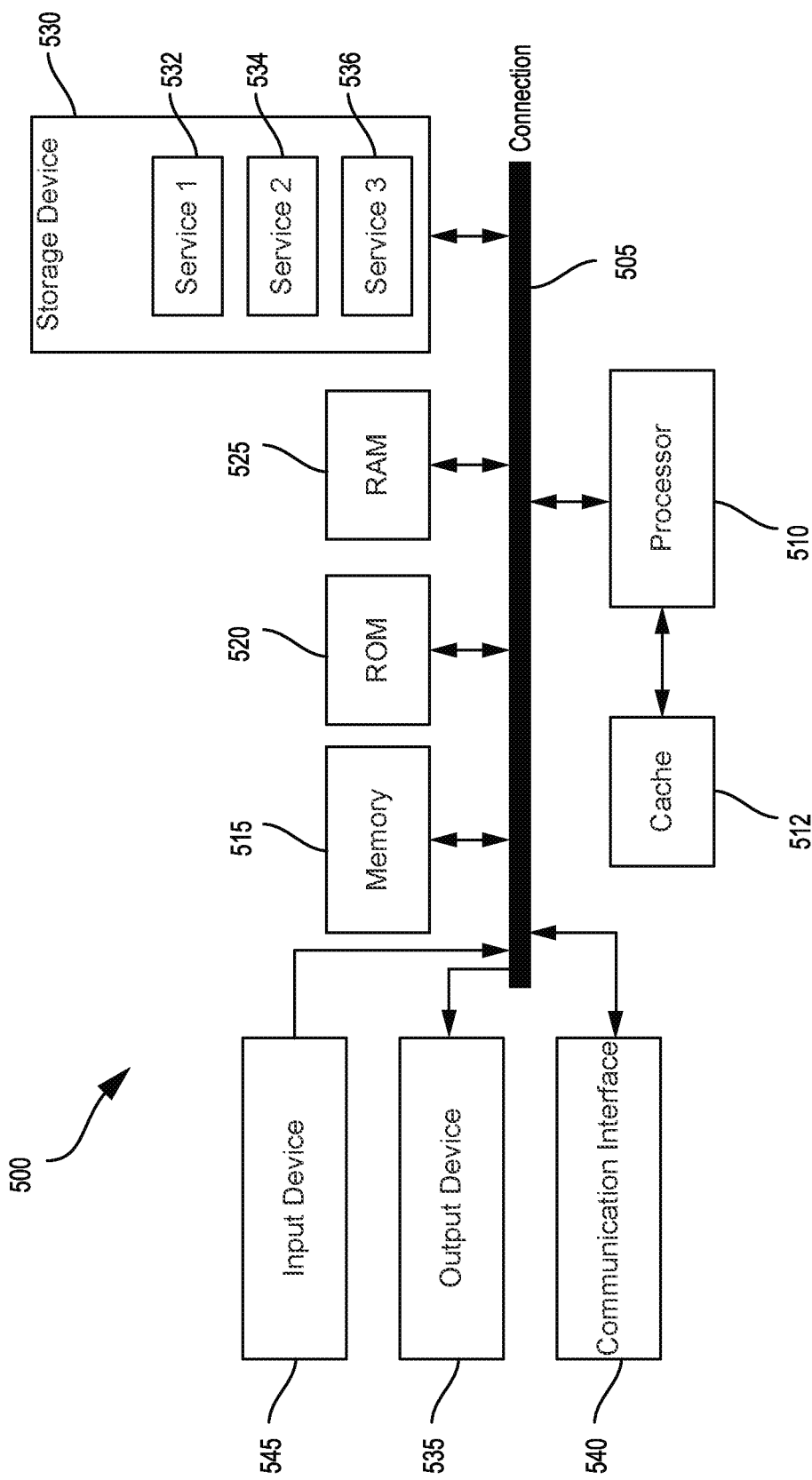
FIG. 5 is a diagram illustrating an example system architecture for implementing certain aspects described herein.

FIG. 5 illustrates an example processor-based system with which some aspects of the subject technology can be implemented. For example, processor-based system 500 can be any computing device making up, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communication interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: a memory; and one or more processors coupled to the memory, wherein the one or more processors are configured to: receive a first measurement output from a first inertial measurement unit (IMU) associated with a first sensor of an autonomous vehicle (AV) and a second measurement output from a second IMU associated with a second sensor of the AV; adjust the first measurement output based on a first offset vector corresponding to the first IMU to obtain a first adjusted measurement output, wherein the first offset vector associates the first IMU with a center of rotation of the AV; adjust the second measurement output based on a second offset vector corresponding to the second IMU to obtain a second adjusted measurement output, wherein the second offset vector associates the second IMU with the center of rotation of the AV; and determine a pose of the AV based on the first adjusted measurement output and the second adjusted measurement output.

Aspect 2. The system of Aspect 1, wherein the first measurement output includes a first plurality of measurement outputs associated with a first sampling rate and wherein the second measurement output includes a second plurality of measurement outputs associated with a second sampling rate.

Aspect 3. The system of Aspect 2, wherein the one or more processors are further configured to: adjust the first plurality of measurement outputs based on the first offset vector to obtain a first plurality of adjusted measurement outputs; adjust the second plurality of measurement outputs based on the second offset vector to obtain a second plurality of adjusted measurement outputs; and combine the first plurality of adjusted measurement outputs with the second plurality of adjusted measurement outputs to obtain an average of adjusted measurement outputs, wherein the average of adjusted measurement outputs is associated with an aggregate sampling rate that is based on the first sampling rate and the second sampling rate.

Aspect 4. The system of any of Aspects 1 to 3, wherein the one or more processors are further configured to: perform a comparison between the first adjusted measurement output of the first IMU and an average of adjusted measurement outputs of a plurality of IMUs associated with a plurality of sensors of the AV; and in response to a determination that a difference between the first adjusted measurement output and the average of adjusted measurement outputs exceeds an error threshold, eliminate the first adjusted measurement output of the first IMU in determining the average of adjusted measurement outputs.

Aspect 5. The system of Aspect 4, wherein the comparison between the first adjusted measurement output and the average of adjusted measurement outputs is based on a covariance matrix.

Aspect 6. The system of any of Aspects 1 to 5, wherein the one or more processors are further configured to: identify a first timestamp corresponding to the first measurement output and a second timestamp corresponding to the second measurement output; and combine the first measurement output and the second measurement output based on the first timestamp and the second timestamp.

Aspect 7. The system of any of Aspects 1 to 6, wherein the first offset vector and the second offset vector are determined during calibration of the first sensor and the second sensor.

Aspect 8. The system of any of Aspects 1 to 7, wherein the center of rotation of the AV is located at a center of a rear axle of the AV.

Aspect 9. The system of any of Aspects 1, wherein the first sensor and the second sensor comprise at least one of a camera, a Light Detection and Ranging (LiDAR) sensor, a Radio Detection and Ranging (RADAR) sensor, and a Global Positioning System (GPS).

Aspect 10. A method comprising: receiving a first measurement output from a first inertial measurement unit (IMU) associated with a first sensor of an autonomous vehicle (AV) and a second measurement output from a second IMU associated with a second sensor of the AV; adjusting the first measurement output based on a first offset vector corresponding to the first IMU to obtain a first adjusted measurement output, wherein the first offset vector associates the first IMU with a center of rotation of the AV; adjusting the second measurement output based on a second offset vector corresponding to the second IMU to obtain a second adjusted measurement output, wherein the second offset vector associates the second IMU with the center of rotation of the AV; and determining a pose of the AV based on the first adjusted measurement output and the second adjusted measurement output.

Aspect 11. The method of Aspect 10, wherein the first measurement output includes a first plurality of measurement outputs associated with a first sampling rate and wherein the second measurement output includes a second plurality of measurement outputs associated with a second sampling rate.

Aspect 12. The method of Aspect 11, further comprising: adjusting the first plurality of measurement outputs based on the first offset vector to obtain a first plurality of adjusted measurement outputs; adjusting the second plurality of measurement outputs based on the second offset vector to obtain a second plurality of adjusted measurement outputs; and combining the first plurality of adjusted measurement outputs with the second plurality of adjusted measurement outputs to obtain an average of adjusted measurement outputs, wherein the average of adjusted measurement outputs is associated with an aggregate sampling rate that is based on the first sampling rate and the second sampling rate.

Aspect 13. The method of any of Aspects 10 to 12, further comprising: performing a comparison between the first adjusted measurement output of the first IMU and an average of adjusted measurement outputs of a plurality of IMUs associated with a plurality of sensors of the AV; and in response to a determination that a difference between the first adjusted measurement output and the average of adjusted measurement outputs exceeds an error threshold, eliminating the first adjusted measurement output of the first IMU in determining the average of adjusted measurement outputs.

Aspect 14. The method of Aspect 13, wherein the comparison between the first adjusted measurement output and the average of adjusted measurement outputs is based on a covariance matrix.

Aspect 15. The method of any of Aspects 10 to 14, further comprising: identifying a first timestamp corresponding to the first measurement output and a second timestamp corresponding to the second measurement output; and combining the first measurement output and the second measurement output based on the first timestamp and the second timestamp.

Aspect 16. The method of any of Aspects 10 to 15, wherein the first offset vector and the second offset vector are determined during calibration of the first sensor and the second sensor.

Aspect 17. The method of any of Aspects 10 to 16, wherein the center of rotation of the AV is located at a center of a rear axle of the AV.

Aspect 18. The method of any of Aspects 10 to 17, wherein the first sensor and the second sensor comprise at least one of a camera, a Light Detection and Ranging (LiDAR) sensor, a Radio Detection and Ranging (RADAR) sensor, and a Global Positioning System (GPS).

Aspect 19. A non-transitory computer-readable media comprising instructions stored thereon which, when executed are configured to cause a computer or processor to: receive a first measurement output from a first inertial measurement unit (IMU) associated with a first sensor of an autonomous vehicle (AV) and a second measurement output from a second IMU associated with a second sensor of the AV; adjust the first measurement output based on a first offset vector corresponding to the first IMU to obtain a first adjusted measurement output, wherein the first offset vector associates the first IMU with a center of rotation of the AV; adjust the second measurement output based on a second offset vector corresponding to the second IMU to obtain a second adjusted measurement output, wherein the second offset vector associates the second IMU with the center of rotation of the AV; and determine a pose of the AV based on the first adjusted measurement output and the second adjusted measurement output.

Aspect 20. The non-transitory computer-readable media of Aspect 19, wherein the first measurement output includes a first plurality of measurement outputs associated with a first sampling rate and wherein the second measurement output includes a second plurality of measurement outputs associated with a second sampling rate.

Aspect 21. A system comprising means for performing a method according to any of Aspects 10 to 18.

Aspect 22. A computer-program product having stored thereon instructions which, when executed by one or more processors, cause the one or more processors to perform a method according to any of Aspects 10 to 18.

Aspect 23. Aspect 23. An autonomous vehicle comprising a computer system configured to perform a method according to any of Aspects 10 to 18.

What is claimed is:
1. A system comprising:
 a memory; and
 one or more processors coupled to the memory, wherein the one or more processors are configured to:
  receive a first measurement output from a first inertial measurement unit (IMU) associated with a first sensor of an autonomous vehicle (AV) and a second measurement output from a second IMU associated with a second sensor of the AV;
  adjust the first measurement output based on a first offset vector corresponding to the first IMU to obtain a first adjusted measurement output, wherein the first offset vector associates the first IMU with a center of rotation of the AV;
  adjust the second measurement output based on a second offset vector corresponding to the second IMU to obtain a second adjusted measurement output, wherein the second offset vector associates the second IMU with the center of rotation of the AV;

determine a pose of the AV based on the first adjusted measurement output and the second adjusted measurement output; and perform a comparison between the first adjusted measurement output of the first IMU and an average of adjusted measurement outputs of a plurality of IMUs associated with a plurality of sensors of the AV; and in response to a determination that a difference between the first adjusted measurement output and the average of adjusted measurement outputs exceeds an error threshold, eliminate the first adjusted measurement output of the first IMU in determining the average of adjusted measurement outputs.

2. The system of claim 1, wherein the first measurement output includes a first plurality of measurement outputs associated with a first sampling rate and wherein the second measurement output includes a second plurality of measurement outputs associated with a second sampling rate.

3. The system of claim 2, wherein the one or more processors are further configured to:

adjust the first plurality of measurement outputs based on the first offset vector to obtain a first plurality of adjusted measurement outputs;

adjust the second plurality of measurement outputs based on the second offset vector to obtain a second plurality of adjusted measurement outputs; and combine the first plurality of adjusted measurement outputs with the second plurality of adjusted measurement outputs to obtain an average of adjusted measurement outputs, wherein the average of adjusted measurement outputs is associated with an aggregate sampling rate that is based on the first sampling rate and the second sampling rate.

4. The system of claim 1, wherein the comparison between the first adjusted measurement output and the average of adjusted measurement outputs is based on a covariance matrix.

5. The system of claim 1, wherein the one or more processors are further configured to:

identify a first timestamp corresponding to the first measurement output and a second timestamp corresponding to the second measurement output; and combine the first measurement output and the second measurement output based on the first timestamp and the second timestamp.

6. The system of claim 1, wherein the first offset vector and the second offset vector are determined during calibration of the first sensor and the second sensor.

7. The system of claim 1, wherein the center of rotation of the AV is located at a center of a rear axle of the AV.

8. The system of claim 1, wherein the first sensor and the second sensor comprise at least one of a camera, a Light Detection and Ranging (LiDAR) sensor, a Radio Detection and Ranging (RADAR) sensor, and a Global Positioning System (GPS).

9. A method comprising:

receiving a first measurement output from a first inertial measurement unit (IMU) associated with a first sensor of an autonomous vehicle (AV) and a second measurement output from a second IMU associated with a second sensor of the AV;

adjusting the first measurement output based on a first offset vector corresponding to the first IMU to obtain a first adjusted measurement output, wherein the first offset vector associates the first IMU with a center of rotation of the AV;

adjusting the second measurement output based on a second offset vector corresponding to the second IMU to obtain a second adjusted measurement output, wherein the second offset vector associates the second IMU with the center of rotation of the AV;

determining a pose of the AV based on the first adjusted measurement output and the second adjusted measurement output, wherein the first measurement output includes a first plurality of measurement outputs associated with a first sampling rate and wherein the second measurement output includes a second plurality of measurement outputs associated with a second sampling rate;

adjusting the first plurality of measurement outputs based on the first offset vector to obtain a first plurality of adjusted measurement outputs;

adjusting the second plurality of measurement outputs based on the second offset vector to obtain a second plurality of adjusted measurement outputs; and combining the first plurality of adjusted measurement outputs with the second plurality of adjusted measurement outputs to obtain an average of adjusted measurement outputs, wherein the average of adjusted measurement outputs is associated with an aggregate sampling rate that is based on the first sampling rate and the second sampling rate.

10. The method of claim 9, further comprising:

performing a comparison between the first adjusted measurement output of the first IMU and an average of adjusted measurement outputs of a plurality of IMUs associated with a plurality of sensors of the AV; and in response to a determination that a difference between the first adjusted measurement output and the average of adjusted measurement outputs exceeds an error threshold, eliminating the first adjusted measurement output of the first IMU in determining the average of adjusted measurement outputs.

11. The method of claim 10, wherein the comparison between the first adjusted measurement output and the average of adjusted measurement outputs is based on a covariance matrix.

12. The method of claim 9, further comprising:

identifying a first timestamp corresponding to the first measurement output and a second timestamp corresponding to the second measurement output; and combining the first measurement output and the second measurement output based on the first timestamp and the second timestamp.

13. The method of claim 9, wherein the first offset vector and the second offset vector are determined during calibration of the first sensor and the second sensor.

14. The method of claim 9, wherein the center of rotation of the AV is located at a center of a rear axle of the AV.

15. The method of claim 9, wherein the first sensor and the second sensor comprise at least one of a camera, a Light Detection and Ranging (LiDAR) sensor, a Radio Detection and Ranging (RADAR) sensor, and a Global Positioning System (GPS).

16. A non-transitory computer-readable media comprising instructions stored thereon which, when executed are configured to cause a computer or processor to:

receive a first measurement output from a first inertial measurement unit (IMU) associated with a first sensor of an autonomous vehicle (AV) and a second measurement output from a second IMU associated with a second sensor of the AV;

adjust the first measurement output based on a first offset vector corresponding to the first IMU to obtain a first adjusted measurement output, wherein the first offset vector associates the first IMU with a center of rotation of the AV;

adjust the second measurement output based on a second offset vector corresponding to the second IMU to obtain a second adjusted measurement output, wherein the second offset vector associates the second IMU with the center of rotation of the AV; and determine a pose of the AV based on the first adjusted measurement output and the second adjusted measurement output; and perform a comparison between the first adjusted measurement output of the first IMU and an average of adjusted measurement outputs of a plurality of IMUs associated with a plurality of sensors of the AV; and in response to a determination that a difference between the first adjusted measurement output and the average of adjusted measurement outputs exceeds an error threshold, eliminate the first adjusted measurement output of the first IMU in determining the average of adjusted measurement outputs.

17. The non-transitory computer-readable media of claim 16, wherein the first measurement output includes a first plurality of measurement outputs associated with a first sampling rate and wherein the second measurement output includes a second plurality of measurement outputs associated with a second sampling rate.

* * * * *